(12) United States Patent
Ko et al.

(10) Patent No.: US 11,425,081 B2
(45) Date of Patent: Aug. 23, 2022

(54) MESSAGE RECEPTION NOTIFICATION METHOD AND ELECTRONIC DEVICE SUPPORTING SAME

(71) Applicant: SAMSUNG ELECTRONICS CO., LTD., Suwon-si (KR)

(72) Inventors: Hyungkeun Ko, Suwon-si (KR); Eunjoo Kim, Suwon-si (KR); Hyunbin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 65 days.

(21) Appl. No.: 16/977,657

(22) PCT Filed: Mar. 5, 2019

(86) PCT No.: PCT/KR2019/002534
§ 371 (c)(1),
(2) Date: Sep. 2, 2020

(87) PCT Pub. No.: WO2019/172616
PCT Pub. Date: Sep. 12, 2019

(65) Prior Publication Data
US 2020/0396197 A1    Dec. 17, 2020

(30) Foreign Application Priority Data
Mar. 6, 2018 (KR) .................. 10-2018-0026255

(51) Int. Cl.
*H04L 51/224* (2022.01)
*H04L 51/066* (2022.01)
(Continued)

(52) U.S. Cl.
CPC .......... *H04L 51/24* (2013.01); *H04L 51/066* (2013.01); *H04L 51/38* (2013.01); *H04M 1/725* (2013.01);
(Continued)

(58) Field of Classification Search
CPC ....... H04L 51/24; H04L 51/066; H04L 51/38; H04M 1/725; H04M 3/42348; H04M 2201/36; H04M 2201/38
See application file for complete search history.

(56) References Cited

U.S. PATENT DOCUMENTS 7,899,468 B2    3/2011   Lohtia et al.
8,032,120 B2    10/2011  Kwon et al.
(Continued)

FOREIGN PATENT DOCUMENTS

CN    101179766    5/2008
CN    105959878    9/2016
(Continued)

OTHER PUBLICATIONS

Extended Search Report dated Apr. 14, 2021 in European Application No. 19764825.6.
(Continued)

*Primary Examiner* — Kristie D Shingles
(74) *Attorney, Agent, or Firm* — Nixon & Vanderhye, P.C.

(57) ABSTRACT

An electronic device is disclosed. An electronic device according to various embodiments disclosed in the present document may comprise: a communication circuit; an audio output device; and a processor electrically connected to the communication circuit and the audio output device, wherein the processor is configured to: when a message is received from an external server apparatus through the communication circuit, identify whether the received message has a designated format; and parse audio data from the received message when the received message has a designated format, and output, through the audio output device, the parsed audio data as a notification sound notifying of the message (Continued)

reception. In addition, various embodiments recognized through the specification are possible.

19 Claims, 11 Drawing Sheets

(51) Int. Cl.
    *H04L 51/58*     (2022.01)
    *H04M 1/725*     (2021.01)
    *H04M 3/42*     (2006.01)

(52) U.S. Cl.
    CPC .... *H04M 3/42348* (2013.01); *H04M 2201/36* (2013.01); *H04M 2201/38* (2013.01)

(56) References Cited

U.S. PATENT DOCUMENTS

| | | | |
|---|---|---|---|
| 8,331,268 B2 | 12/2012 | Hicks, III | |
| 8,364,170 B2 | 1/2013 | Lohtia et al. | |
| 8,711,738 B2 | 4/2014 | Hicks, III | |
| 8,868,136 B2 | 10/2014 | Davidson | |
| 9,294,429 B2 | 3/2016 | Hahm et al. | |
| 10,038,780 B2 | 7/2018 | Lee et al. | |
| 10,104,228 B2 | 10/2018 | Kats et al. | |
| 10,511,711 B2 | 12/2019 | Kats et al. | |
| 2004/0030753 A1* | 2/2004 | Horvitz | H04W 4/02 709/206 |
| 2005/0059434 A1 | 3/2005 | Hong | |
| 2007/0078596 A1 | 4/2007 | Grace | |
| 2007/0191029 A1 | 8/2007 | Zarem et al. | |
| 2009/0058632 A1 | 3/2009 | Hicks, III | |
| 2010/0205242 A1 | 8/2010 | Marchioro, II et al. | |
| 2012/0220347 A1 | 8/2012 | Davidson | |
| 2013/0009776 A1 | 1/2013 | Hicks, III | |
| 2013/0275881 A1 | 10/2013 | Hahm et al. | |
| 2015/0229770 A1* | 8/2015 | Shuman | H04M 3/54 379/211.02 |
| 2015/0245171 A1 | 8/2015 | Noh et al. | |
| 2016/0227027 A1 | 8/2016 | Lee et al. | |
| 2018/0048762 A1 | 2/2018 | Kats et al. | |
| 2018/0069815 A1* | 3/2018 | Fontana | H04L 51/04 |
| 2019/0045052 A1 | 2/2019 | Kats et al. | |

FOREIGN PATENT DOCUMENTS

| | | |
|---|---|---|
| CN | 106851020 | 6/2017 |
| JP | 2009-538102 | 10/2009 |
| KR | 2001-0056424 | 7/2001 |
| KR | 10-0738204 | 7/2007 |
| KR | 10-0998896 | 12/2010 |
| KR | 10-2013-0116714 | 10/2013 |
| KR | 10-2015-0098741 | 8/2015 |

OTHER PUBLICATIONS

Office Action dated Apr. 6, 2021 in Chinese Application No. 201980017180.5 and English-language translation.
International Search Report for PCT/KR2019/002534 dated Jul. 4, 2019, 5 pages.
Written Opinion of the ISA for PCT/KR2019/002534 dated Jul. 4, 2019, 5 pages.
Supplementary Partial European Search Report dated Jan. 27, 2021 in counterpart European Patent Application Mo 19764825.6.

* cited by examiner

MESSAGE RECEPTION NOTIFICATION METHOD AND ELECTRONIC DEVICE SUPPORTING SAME

This application is the U.S. national phase of International Application No. PCT/KR2019/002534 filed Mar. 5, 2019 which designated the U.S. and claims priority to KR Patent Application No. 10-2018-0026255 filed Mar. 6, 2018, the entire contents of each of which are hereby incorporated by reference.

FIELD

Various embodiments disclosed in the disclosure are related to a message reception notification technology.

DESCRIPTION OF RELATED ART

An electronic device may output a vibration or a sound when a message is received. For example, the electronic device may output a vibration or a sound based on system setting as a notification for the message reception. In response to the output of the vibration or the sound, a user of the electronic device may identify a transmitter of the message by executing a message application.

SUMMARY

When receiving a message, an electronic device may output a sound corresponding to a message transmitter (or an external device) based on sound information for each transmitter (or for each external device) set by a user for convenience of transmitter identification. However, such a transmitter identification service is limitedly applied only to the transmitter the external device) preset by the user.

Various embodiments disclosed in the disclosure may provide a message reception notification method and an electronic device supporting the same that support a message receiver to easily identify a message transmitter.

An aspect of the disclosure provides an electronic device including a communication circuit, a sound output device, and a processor electrically connected to the communication circuit and the sound output device, wherein the processor may determine whether a received message is in a specified format according to the message from an external server device being received through the communication circuit, parse audio data from the received message according to the received message being in the specified format, and output the parsed audio data through the sound output device as a notification sound notifying the reception of the message.

Another aspect of the disclosure provides an electronic device including a communication circuit, a sound output device, a processor electrically connected to the communication circuit and the sound output device, and a memory functionally connected to the processor, wherein the memory stores instructions that, when executed, cause the processor to determine whether a received message is in a specified format according to the message from an external server device being received through the communication circuit, parse audio data from the received message according to the received message being in the specified format, and output the parsed audio data through the sound output device as a notification sound notifying the reception of the message.

Another aspect of the disclosure provides a method for notifying message reception of an electronic device includes determining whether a received message is in a specified format according to the message being received from an external server device, parsing audio data from the received message according to the received message being in the specified format, and outputting the parsed audio data as a notification sound notifying the reception of the message.

According to various embodiments disclosed in the disclosure, easy transmitter identification for the message received b the electronic device may be supported.

In addition, various effects that may be directly or indirectly identified. through the disclosure may be provided.

BRIEF DESCRIPTION OF THE DRAWINGS

In the description of the drawings, the same or similar reference numerals may be used for the same or similar components.

DETAILED DESCRIPTION OF EXAMPLE EMBODIMENTS

Figure 1:
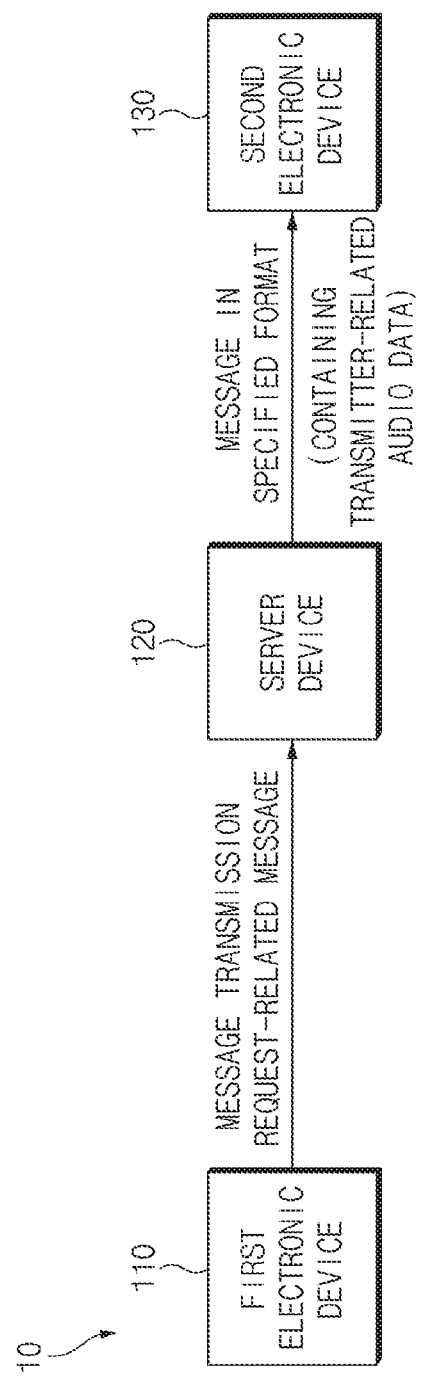
FIG. 1 is a configuration diagram of a message transmission system according to various embodiments of the disclosure.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that when an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Hereinafter, an electronic device according to various embodiments will be described with reference to the accompanying drawings. In the disclosure, a term 'user' may refer to a person using the electronic device or a device (e.g., an artificial intelligence electronic device) using the electronic device.

FIG. 1 is a configuration diagram of a message transmission system according to various embodiments of the disclosure.

Referring to FIG. 1, a message transmission system 10 according to an embodiment may include a first electronic device 110, a second electronic device 130, and a server device 120. According to various embodiments, the message transmission system 10 may further include at least one another electronic device in addition to the first electronic device 110 and the second electronic device 130, but for convenience of description, a case in which the message transmission system 10 includes the first electronic device 110 and the second electronic device 130 will be described as an example.

According to an embodiment, the first electronic device 110, which is a device on which a specified app is installed, may be a device registered (e.g., signed up) to the server device 120 in connection with use of a message transmission service through the specified app. When registering the use of the message transmission service through the specified app, the first electronic device 110 may acquire (or record) audio data related to a first user (e.g., a user of the first electronic device 110) and transmit a message containing the acquired first user-related audio data to the server device 120. The audio data may be, for example, data containing a voice of the first user who has uttered a specified word (e.g., 'SSUP').

According to an embodiment, the second electronic device 130, which is a device on which the specified app is installed, may be a device registered (e.g., signed up) to the server device 120 in connection with the use of the message transmission service through the specified app. When registering the use of the message transmission service through the specified app, the second electronic device 130 may acquire (or record) audio data related to a second user (e.g., a user of the second electronic device 130) and transmit a message containing the acquired audio data to the server device 120. The audio data may be, for example, data containing a voice of the second user who has uttered a specified word.

According to an embodiment, the server device 120 may support the message transmission service between the first electronic device 110 and the second electronic device 130. The message transmission service may include for example, at least one of a social network service (SNS), a messenger service, and a text transmission service. The server device 120 may transmit and receive a HTTP-based message with the first electronic device 110 and the second electronic device 130.

When receiving a message requesting the message transmission service use registration from the first electronic device 110 and the second electronic device 130, the server device 120 may communicate with the first electronic device 110 and the second electronic device 130 to receive the first user-related audio data and the second user-related audio data respectively from the first electronic device 110 and the second electronic device 130. When receiving the first user-related audio data and the second user-related audio data, the server device 120 may store the first user-related audio data in a memory in association with information of the first electronic device 110 and store the second user-related audio data in the memory in association with information of the second electronic device 130. Hereinafter, each of the first user-related audio data and the second user-related audio data respectively stored in association with information of the first electronic device 110 and the second electronic device 130 may be referred to as audio data for each user. The information of the first electronic device 110 may include, for example, unique identification information of the first electronic device 110, and the information of the second electronic device 130 may include, for example, unique identification information of the second electronic device 130. The unique identification information may include, for example, an ID, a phone number, a MAC address, a mobile IP address, an email address, or the like of a user of an electronic device.

According to an embodiment, the first electronic device 110 may transmit a message (hereinafter, referred to as a 'request-related message') related to a message transmission request for the second electronic device 130 to the server device 120. The request-related message, which is a message related to a message transmission request to an electronic device corresponding to receiver information, may include at least one of transmitter information of the message (e.g., the information of the first electronic device 110), the receiver information (e.g., the information of the second electronic device 130), and content information of the message. The content information of the message may include type information of the message. The type information of the message, which is, for example, information related to an intention (or a reason) for transmitting the message, may be determined by a menu icon selected by the first user among menu icons provided from the server device 120.

When receiving the request-related message from the first electronic device 110, the server device 120 may identify the transmitter information (e.g., the information of the first electronic device 110) contained in the request-related message and acquire the first user-related audio data based on the audio data for each user. The server device 120 may generate a message in a specified format containing the acquired first user-related audio data and transmit, to the second electronic device 130, the message in the specified format containing the first user-related audio data based on the receiver information (e.g., the information of the second electronic device 130) contained in the request-related message. The message in the specified format may contain, for example, information instructing to output the first user-related audio data as a notification sound of message reception.

When receiving the message from the server device 120, the second electronic device 130 may determine whether the received message is in the specified format. In an embodiment, according to the received message being in the specified format, the second electronic device 130 may parse the user-related audio data from the received message and output the parsed audio data as the notification sound of the message reception. Alternatively, the second electronic device 130 may output a specified (e.g., preset) system notification sound as the notification sound notifying the message reception according to the received message being not in the specified format.

According to various embodiments, the first electronic device 110 may perform direct communication (e.g., peer to peer communication) with the second electronic device 130. For example, the first electronic device 110 may store the first user-related audio data in the memory and transmit the message in the specified format containing the first user-related audio data to the second electronic device 130 in response to a request of the first user. When receiving the message in the specified format, the second electronic device 130 may parse the first user-related audio data from the message in the specified format and output the parsed audio data as the notification sound notifying the message reception.

According to the above-described embodiment, before identifying the content of the received message with eyes, the receiver (e.g., the second user) of the message may hear the user-related audio data (e.g., transmitter-related audio data) contained in the message reception. notification sound to infer or identify the message transmitter.

Figure 2:
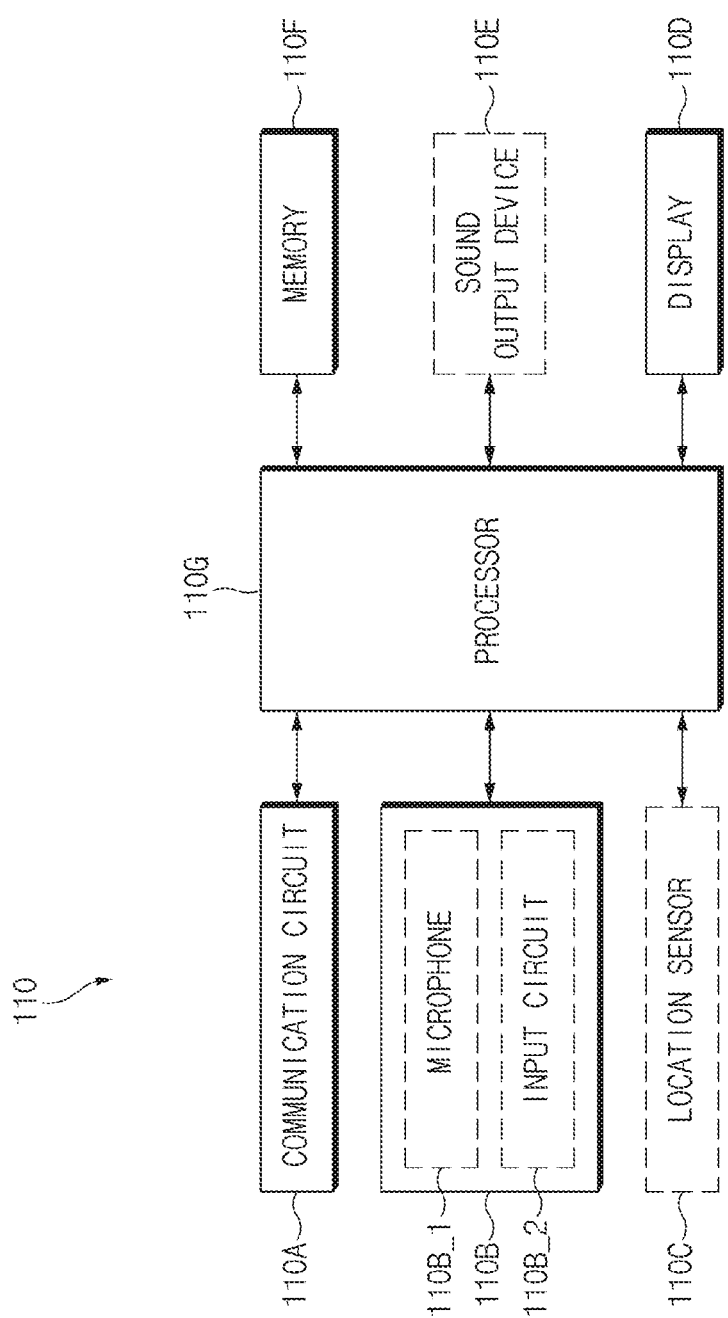
FIG. 2 is a configuration diagram of an electronic device (e.g., 110 in FIG. 1) of a transmitter according to various embodiments of the disclosure.

FIG. 2 is a configuration diagram of an electronic device (e.g., the first electronic device 110 in FIG. 1) of a transmitter according to various embodiments of the disclosure.

Referring to FIG. 2, the first electronic device 110 according to an embodiment may include a communication circuit 110A, an input device 110B, a display 110D, a memory 110F, and a processor 110G. In an embodiment, the first electronic device 110 may omit sonic of the components described. above or may further include an additional component. For example, the first electronic device 110 may further include at least one of a sound output device 110E and a location sensor 110C. In an embodiment, some of the components may be combined with each other to become a single entity but may perform functions of the corresponding components before the combination in the same manner.

According to an embodiment, the communication circuit 110A may form a communication channel in a specified communication scheme for the communication with the server device (120 in FIG. 1). The specified communication scheme may include, for example, at least one communication scheme of mobile communication (e.g., 3G, 4G, and/or 5G) and short-range communication (a WiFi, a Zigbee and/or a Bluetooth, and the like). The communication circuit 110A may convert a signal received from the server device 120 into a format that may be interpreted by the processor 110G, and convert the signal from the processor 110G into a signal in the specified communication scheme and transmit the converted signal in the specified communication scheme through the corresponding communication channel.

According to an embodiment, the input device 110B may include at least one of a microphone (MIC) 110B_1 capable of acquiring the audio data corresponding to the voice of the first user and an input circuit 110B_2 capable of receiving a user input. The input circuit 110B_2 may include, for example, a touch circuit (not shown) to sense a touch.

According to an embodiment, the location sensor 110C may calculate current location information (e.g., a GPS coordinate value) of the first electronic device 110. The location sensor 110C may include, for example, a GPS receiving circuit (not shown).

According to an embodiment, the display 110D may display various contents (e.g., a text, an image, a video, an icon, and/or a symbol, and the like). The display 110D may include, for example, a liquid crystal display (LCD), a light emitting diode (LED) display, an organic light emitting diode (OLED) display, or an electronic paper display. The display 110D may include a touch screen display including a touch circuit.

According to an embodiment, the sound output device 110E may support multimedia playback or recording playback. For example, the sound output device 110E may output the first user-related audio data acquired through the input device 110B (e.g., the microphone) under control of the processor 110G. The sound output device 110E may include, for example, a speaker, an earphone, and the like.

According to an embodiment, the memory 110F may store a command or data associated with at least one another component of the first electronic device 110. For example, the memory 110F may store instructions for execution of the specified app. In another example, the memory 110F may store the first user-related audio data. The memory 110F may include a volatile memory (e.g., a RAM, and the like), a non-volatile memory (e.g., a ROM and/or a flash memory, and the like), or a combination thereof.

According to an embodiment, the processor 110G may control at least one another component of the first electronic device 110 using the instructions stored in the memory 110F or execute an operation or data processing associated with the communication. The processor 110G may include, for example, at least one of a central processing device (CPU), a graphics processing device (GPU), a microprocessor, an application processor, an application specific semiconductor (an application specific integrated circuit (ASIC), and a field programmable gate array (FPGA) and may have a plurality of cores.

According to an embodiment, the processor 110G may execute the specified app in response to the user input through the input device 110B. The specified app may be an app for the message transmission service. The processor 110G may provide the message transmission service through the server device 120 when the specified app is executed.

According to an embodiment, when receiving a user input to register the use of the message transmission service (or record the audio data) through the input device 110B, the processor 110G may acquire (e.g., record) the first user-related audio data through the microphone 110B_1 and store the acquired first user-related audio data in the memory 110F. The processor 110G may register (store) the first user-related audio data in the server device 120 as the processor 110G transmits the message containing the first user-related audio data to the server device 120.

According to an embodiment, when receiving a user input of requesting message transmission through the input device 110B, the processor 110G may identify the receiver information of the message based on the user input. The processor 110G may transmit the request-related message containing the receiver information, the transmitter information, and the message type information to the server device 120.

According to an embodiment, the processor 110G may acquire the current location information of the first electronic device 110 through the location sensor 110C and transmit the current location information of the first electronic device 110 to the server device 120. For example, according to a location sharing function being set in response to the reception of the user input through the input device 110B, the processor 110G may transmit the current location information of the first electronic device 110 to the server device 120. For example, the processor 110G may periodically transmit the current location information of the first electronic device 110 or transmit the current location information when there is a change equal to or greater than a specified distance in the location information.

According to an embodiment, the processor 110G may receive, from the server device 120, a proximity notification message transmitted by the server device 120 to notify a proximity of a surrounding electronic device within a certain radius from the first electronic device 110. For example, when identifying that the second electronic device (130 in FIG. 1) is located within the specified radius from the first electronic device 110, the server device 120 may transmit, to the first electronic device 110, the proximity notification message for notifying the proximity of the second electronic device 130. The proximity notification message may be, for example, a message in a specified format containing the second user-related audio data. When receiving the proximity notification message, the processor 110G may parse the second user-related audio data and output the parsed audio data as the notification sound for the message reception. The proximity notification message may contain at least one of information profile information and/or the unique identification information) and proximity distance information of the second electronic device 130 close to the first electronic device 110.

According to an embodiment, the second electronic device 130 may be the same as or similar to the first electronic device 110. For example, a component included in the second electronic device 130 may be the same as or similar to the component of the first electronic device 110 described above. Hereinafter, the component of the first electronic device 110 presented in FIG. 2 may be referenced in association with description of an operation of the second electronic device 130.

Referring to FIG. 2, when receiving the message from the server device 120 through a communication circuit (e.g., 110A), the second electronic device 130 (or a processor (e.g., 110G) of the second electronic device 130) according to an embodiment may determine whether the received message is in the specified format. In an embodiment, according to the received message being in the specified format, the second electronic device 130 may parse audio data from the received message and output the parsed audio data as the notification sound notifying the message reception through a sound output device (e.g., 110E). The message in the specified format may contain, for example, information instructing to output the parsed audio data as the notification sound. The message in the specified format may contain, for example, a message transmitted from the server device 120 to notify proximity of another electronic device (e.g., the first electronic device 110) located within a specified distance from the second electronic device 130. In another example, the message in the specified format may include the message transmitted, by the server device 120, to the second electronic device 130 in response to the message transmission request of the first electronic device 110.

According to an embodiment, the second electronic device 130 may output the specified system notification sound as the notification sound notifying the message reception according to the received message being not in the specified format.

According to an embodiment, the second electronic device 130 may identify the content information of the received message and execute a function corresponding to the message based on the identified content information. For example, the second electronic device 130 may output a screen corresponding to the content information of the message. The message may contain content indicating the type of message selected by the first user through the menu icon (e.g., a meeting offer).

According to an embodiment, the second electronic device 130 may output a screen containing at least one menu icon for responding to the received message through a display (e.g., 110D). When receiving a second user input for the at least one menu icon through an input device (e.g., 110B), the second electronic device 130 may transmit a response message in response to the second user input to the server device 120. When receiving the response message, the server device 120 may generate a response message containing the second user-related audio data and transmit die generated response message to the first electronic device 110.

According to an embodiment, when receiving a specified message, the second electronic device 130 may acquire audio data uttered by the second user through a microphone (e.g., 110B_1) and generate the response message using the acquired audio data. In this regard, the second electronic device 130 may detect an audio signal through the microphone for a specified time period after receiving the specified message, acquire audio data corresponding to the detected audio signal using a speech recognition technology, and determine whether the acquired audio data matches at least one specified response data. According to the acquired audio data matching the at least one response data, the second electronic device 130 may generate a response message corresponding to the at least one response data and transmit the generated response message to the server device 120. The at least one response data may include, for example, first voice data corresponding to a first word (e.g., SSUP) indicating acceptance to the offer based on the message type and second voice data corresponding a. second word (e.g., NOPE) indicating nonacceptance to the offer. The at least one response data may be stored in the memory 110F. In an embodiment, according to the acquired audio data matching the first voice data, the second electronic device 130 may generate a response message indicating the acceptance of the offer and transmit the generated response message to the server device 120. According to the acquired audio data matching the second voice data, the second electronic device 130 may generate a response message indicating the nonacceptance of the offer and transmit the generated response message to the server device 120.

According to an embodiment, the second electronic device 130 may acquire current location information of the second electronic device 110 through a location sensor (e.g., 110C) and transmit the current location information of the second electronic device 130 to the server device 120. For example, according to the location sharing function being set in response to the user input received through an input device (e.g., 110B), the second electronic device 130 may transmit the current location information of the second electronic device 130 to the server device 120. For example, the second electronic device 130 may periodically transmit the current location information or may transmit the current location information when there is a change equal to or greater than a specified distance in the location information.

According to an embodiment, according to the received message containing the audio data even according to being not in the specified format, the second electronic device 130 may output the audio data contained in the received message through a sound output device (e.g., 110E). In this case, when the user input received through an input device (e.g., 110B) is identified as an input requesting playback of the audio data contained in the message the second electronic device 130 may output the received audio data in response to the user input.

According to the above-described embodiment, the second electronic device 130 may support the user to infer or identify the message transmitter by hearing the user-related audio data (e.g., the transmitter-related audio data) contained in the message reception notification sound and easily identify proximity states of other electronic devices on the basis of an electronic device thereof before identifying the content of the received message with eyes.

Figure 3:
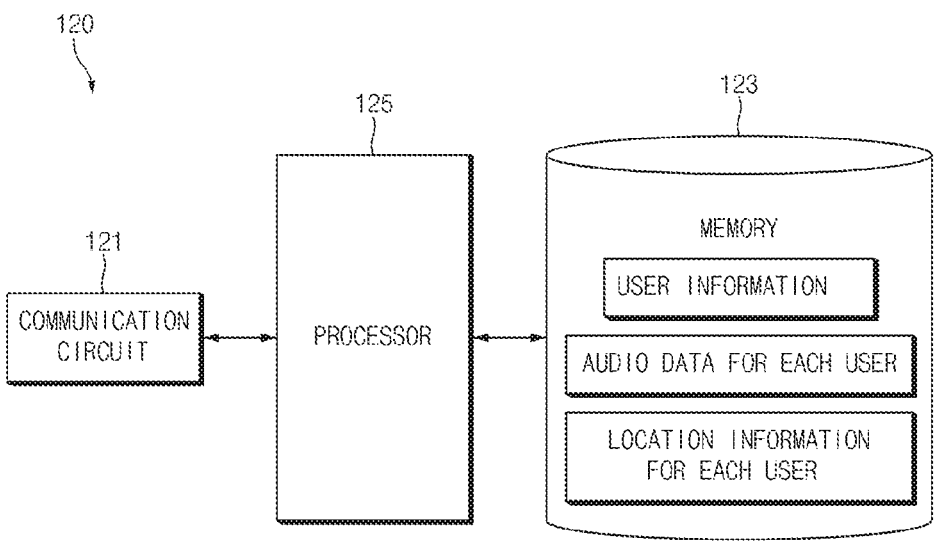
FIG. 3 is a configuration diagram of a server device (e.g., 120 in FIG. 1) according to various embodiments of the disclosure.

FIG. 3 is a configuration diagram of a server device e.g., the server device 120 in FIG. 1) according to various embodiments of the disclosure.

Referring to FIG. 3, the server device 120 according to an embodiment may include a communication circuit 121, a memory 123, and a processor 125. In an embodiment, the server device 120 may omit some of the components described above or may further include an additional component. In various embodiments, some of the components of the server device 120 may be combined with each other to become a single entity, but may perform functions of the corresponding components before the combination in the same manner.

According to an embodiment, the communication circuit 121 may form a communication channel in a specified communication scheme for the communication with the first electronic device 110 or the second electronic device 130. The specified communication scheme include, for example, at least one communication scheme of the mobile communication (e.g., 3G, 4G, and/or 5G) and the short-range communication (the WiFi, the Zigbee and/or the Bluetooth, and the like). The communication circuit 121 may convert a signal received from the first electronic device 110 or die second electronic device 130 into a format that may be interpreted by the processor 125, and convert the signal received from the processor 125 into a signal in the specified communication scheme and transmit the converted signal in the specified communication scheme through the corresponding communication channel.

According to an embodiment, the memory 123 may store a command or data associated with at least one another component of the server device 120. The memory 123 may store information of the electronic device (or information of the user of the electronic device) registered to use the message transmission service and the audio data for each user. The device information may be, for example, the unique identification information of the first electronic device (110 in FIG. 1) and the second electronic device (130 in FIG. 1) registered to use the message transmission service. The audio data for each user may include, for example, the first user-related audio data stored in association with the information of the first electronic device 110 and the second user-related audio data stored in association with the information of the second electronic device 130. The memory 123 may further store location information for each user. The location information for each user may include, for example, location information of the first electronic device 110 and location information of the second electronic device 130 respectively stored in association with the information of the electronic devices 110 and 130. The memory 123 may include the volatile memory (e.g., the RAM, and the like), the non-volatile memory (e.g., the ROM and/or the flash memory, and the like), or the combination thereof.

According to an embodiment, the processor 125 may control at least one another component of the server device 120 using the instructions stored in the memory 123 or execute an operation associated with the communication or data processing. The processor 125 may include, for example, at least one of the central processing device (CPU), the graphics processing device (GPU), the microprocessor, the application processor, the application specific semiconductor (an application specific integrated circuit (ASIC), and the field programmable gate array (FPGA) and may have the plurality of cores.

According to an embodiment, receiving the message from the first elect electronic device 110, the processor 125 may identify the content information (e.g., the type information of the message) of the received message and provide a service corresponding to the message based on the identified content information. The service may include, for example, at least one of the message transmission service and a registration service for the use of the message transmission service.

According to an embodiment, when receiving the message requesting the message transmission service use registration from the first electronic device 110 through the communication circuit 121, the processor 125 may communicate with the first electronic device 110 to receive the message containing the first user-related audio data uttered b the first user, parse the first user-related audio data from the received message, and store the parsed first user-related audio data in the memory 123 in association with the information of the first electronic device 110.

When receiving the message requesting the message transmission service use registration from the second electronic device 130 through the communication circuit 121, the processor 125 may communicate with the second electronic device 130 to receive the message containing the second user-related audio data uttered by the second user, parse the second user-related audio data from the received message, and store the parsed second user-related audio data in the memory 123 in association with the information of the second electronic device 130.

The processor 125 may filter some of the first user-related audio data and the second user-related audio data. For example, the processor 125 may filter a region in which a signal strength is equal to or greater than a specified magnitude from the first user-related audio data, and reconstruct the first user-related audio data to contain the filtered portion. The processor 125 may reconstruct the second user-related audio data in a manner the same as or similar to the manner described above. Each of the first user-related audio data and the second user-related audio data, which is one of the audio data for each user, may be stored in the memory 123 in a form of a lookup table.

According to an embodiment, when receiving the request-related message for the second electronic device 130 from the first electronic device 110, the processor 125 may identify the transmitter information (e.g., the information of the first electronic device 110), the receiver information (e.g., the information of the second electronic device 130), and the content information of the message contained in the request-related message. The processor 125 may identify that the first user-related audio data is required from the transmitter information and may acquire the first user-related audio data from the audio data for each user. The processor 125 may generate the message in the specified format containing the first user-related audio data and transmit the message in the specified format generated based on the receiver information to the second electronic device 130. According to various embodiments, when receiving the request-related message, the processor 125 may determine whether there is a history of transmitting the specified message containing the first user-related audio data to the second electronic device 130, and transmit a message instructing an output of a notification of the first user-related audio data to the second electronic device 130 according to there being the transmission history.

According to an embodiment, the processor 125 may track locations of electronic devices registered to use the message transmission service and provide a proximity notification service for electronic devices located in a certain region among the electronic devices registered to use the message transmission service. In this regard, according to the first electronic device 110 and the second electronic device 130 having agreed on the proximity notification service therebetween, the processor 125 may receive location information of the first electronic device 110 from the first electronic device 110 through the communication circuit 121 and receive location information of the second electronic device 130 from the second electronic device 130. The processor 125 may store the received location information in the memory 123. According to a distance between the first electronic device 110 and the second electronic device 130 is equal to or less than a specified distance, the processor 125 may transmit, to the first electronic device 110, the proximity notification message for notifying the proximity of the second electronic device 130, and may transmit, to the second electronic device 130, the proximity notification message for notifying the proximity of the first electronic device 110.

According to the above-described embodiment, the server device 120 may support the user of the electronic device registered to the message transmission service to infer or identify the message transmitter by hearing the transmitter-related audio data. contained in the message reception notification sound and easily identify the proximity state of another electronic device before identifying the content of the received message with the eyes.

Figure 4:
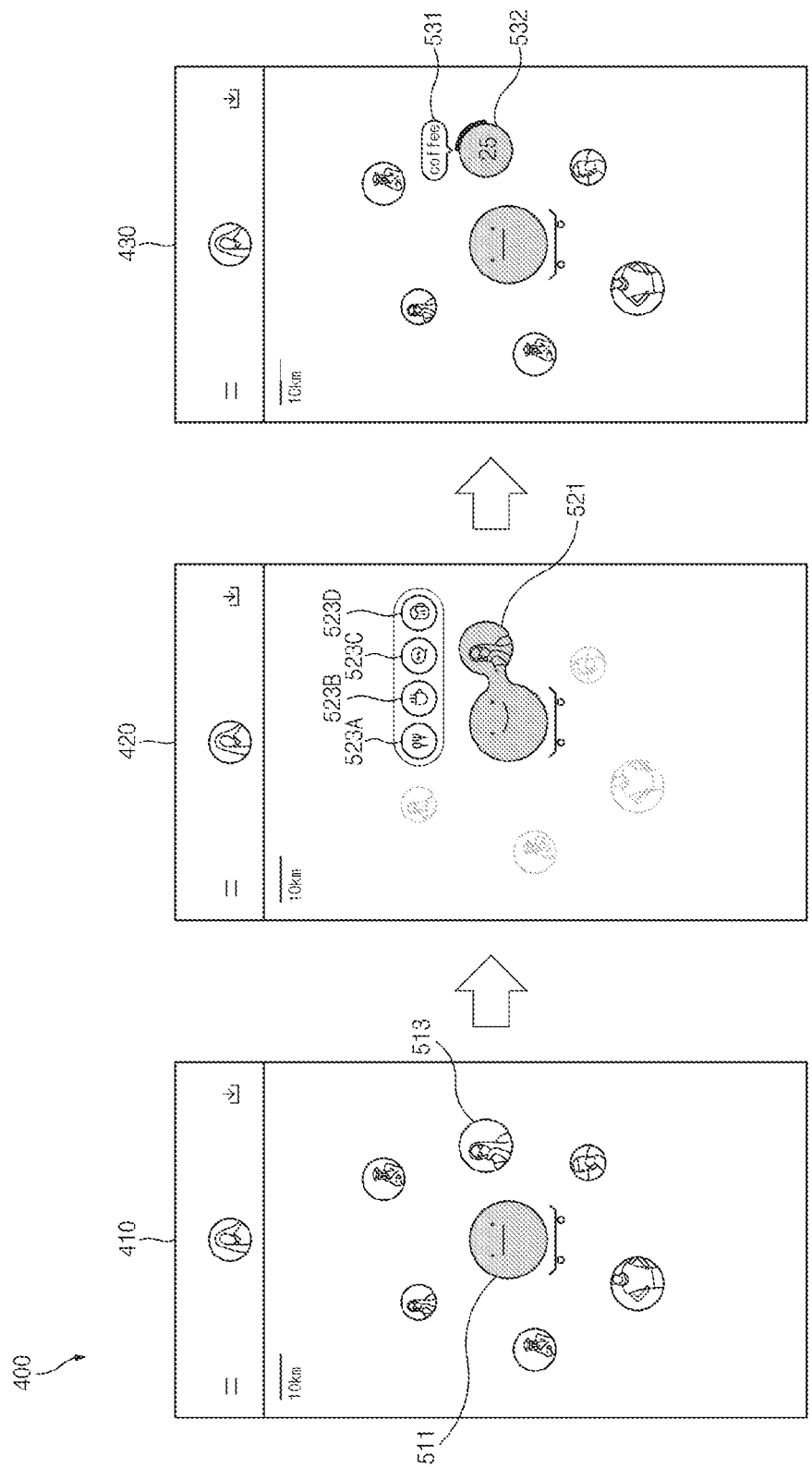
FIG. 4 illustrates a UI screen of an app installed on a first electronic device according to various embodiments of the disclosure.

FIG. 4 illustrates a UI screen 400 of an app installed on a first electronic device according to various embodiments of the disclosure.

Referring to a screen 410 in FIG. 4, according to a specified app being executed, a first electronic device (e.g., the first electronic device 110 in FIG. 1) may receive, from the server device (120 in FIG. 1), a message related to location information of an electronic device (e.g., 513) located in a certain region from a location 511 of the first electronic device 110 among electronic devices registered to use the message transmission service. The specified app may include, for example, a messenger app. The certain region may be, for example, a region within a specified radius (e.g., 10 km) from the first electronic device 110, and the specified radius may be changed by a user input. The location information-related message may include unique identification information of the electronic device 513 located in the certain region and distance information between the first electronic device 110 and the electronic device 513 located in the certain region. The unique identification information may include, for example, at least one of user ID information and phone number information. According to various embodiments, the location information-related message may further include profile information (e.g., a picture and/or nickname) of a user of the electronic device 513 located in the certain region.

According to a specified function (e.g., a close friend view function) being selected from the user through the specified app, the first electronic device 110 may transmit a message requesting location information of electronic devices (e.g., 610A, 610B, and 610C in FIG. 6 to be described below) grouped in the server device 120, and may receive location information-related message of an electronic device located in the certain region from the first electronic device 110 among the grouped electronic devices 610A, 610B, and 610C. The grouped electronic devices 610A, 610B, and 610C may include, for example, mutual friend registered relationships. When notifying the first electronic device 110 of an electronic device newly entered a location within a. certain radius from the first electronic device 110, the server device 120 may transmit a proximity notification message containing audio data related to a user of the newly entered electronic device. In this case, the first electronic device 110 may identify that the proximity notification message is a message in a specified format, correspondingly parse the user-related audio data, and output the parsed audio data as a notification sound notifying reception of the proximity notification message. The proximity notification message may include at least one of information (e.g., profile information and/or unique identification information) and proximity distance information of an electronic device close to the first electronic device 110.

Referring to a screen 420, according to one 521 (e.g., the second electronic device 130 in FIG. 1) of the grouped electronic devices being selected, the first electronic device 110 may output a plurality of menu icons 523A, 523B, 523C, and 523D from which a type of a message to be transmitted to the second electronic device 130 may be selected. The type of the message, which relates to a type of a meeting to be offered, may include, for example, the first menu icon 523A for a meal offer, the second menu icon 523B for a coffee break offer, the third menu icon 523C for a chat time offer, or the fourth menu icon 523D for a drinking party offer.

Referring to a screen 430, according to the second menu icon 523B for the coffee break offer being selected among the plurality of menu icons 523A, 523B, 523C, and 523D by the first user, the first electronic device 110 may transmit a coffee break offer-related message to the second electronic device 130. In addition, the first electronic device 110 may display screen information 531 indicating that the coffee break offer-related message has been transmitted to the second electronic device 130. The first electronic device 110 may display information 532 of a time that has elapsed from a time point at which the coffee break offer-related message was transmitted. The first electronic device 110 may display the time information 532 until a response message is received from the second electronic device 130.

Figure 5:
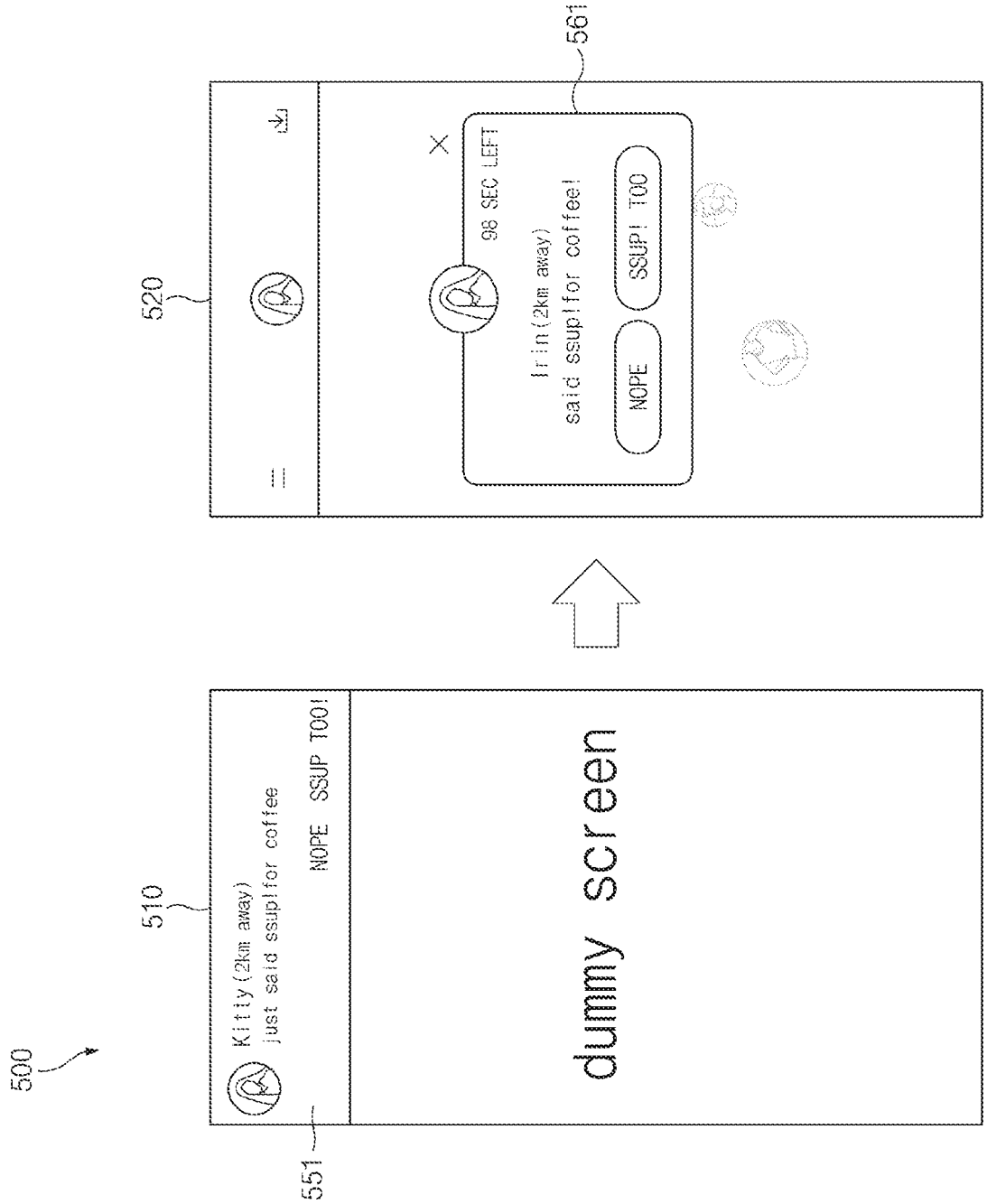
FIG. 5 illustrates a UI screen of an app installed on a second electronic device according to various embodiments of the disclosure.

FIG. 5 illustrates a UI screen 500 of an app installed on a second electronic device according to various embodiments of the disclosure.

Referring to a screen 510 in FIG. 5, when receiving a coffee break offer-related message from a first electronic device (e.g., the first electronic device 110 in FIG. 1), a second electronic device (e.g., the second electronic device 130 in FIG. 1) may parse first user-related audio data from the coffee break offer-related message and output the parsed audio data through a sound output device (e.g., the sound output device 110E in FIG. 2). The first user-related audio data may include, for example, data recorded the specified word 'SSUP' uttered by the first user. The second electronic device 130 may further output a notification window 551 indicating that the coffee break offer-related message is received.

Referring to a screen 520, according to the notification window 551 being selected by the user or according to the output of the coffee break offer-related message being requested through the specified app, the second electronic device 130 may output screen information 561 containing the coffee break offer-related message. The screen information 561 may include, for example, a content (e.g., "Irin said ssup! for coffee!") of the coffee break offer-related message and menu icons (e.g., Nope and SSUP TOO) for selecting a type of a response message. When a second user selects the 'Nope' menu icon among the menu icons, the second electronic device 130 may transmit a message related to coffee break nonacceptance containing, for example, 'Nope' as a content of the message. On the other hand, when the second user selects the 'SSUP TOO' icon among the menu icons, the second electronic device 130 may transmit a message related to coffee break acceptance containing, for example, 'SSUP TOO' as a content of the message. The coffee break nonacceptance-related message and the coffee break acceptance-related message may be messages in a specified format containing second user-related audio data.

Figure 6:
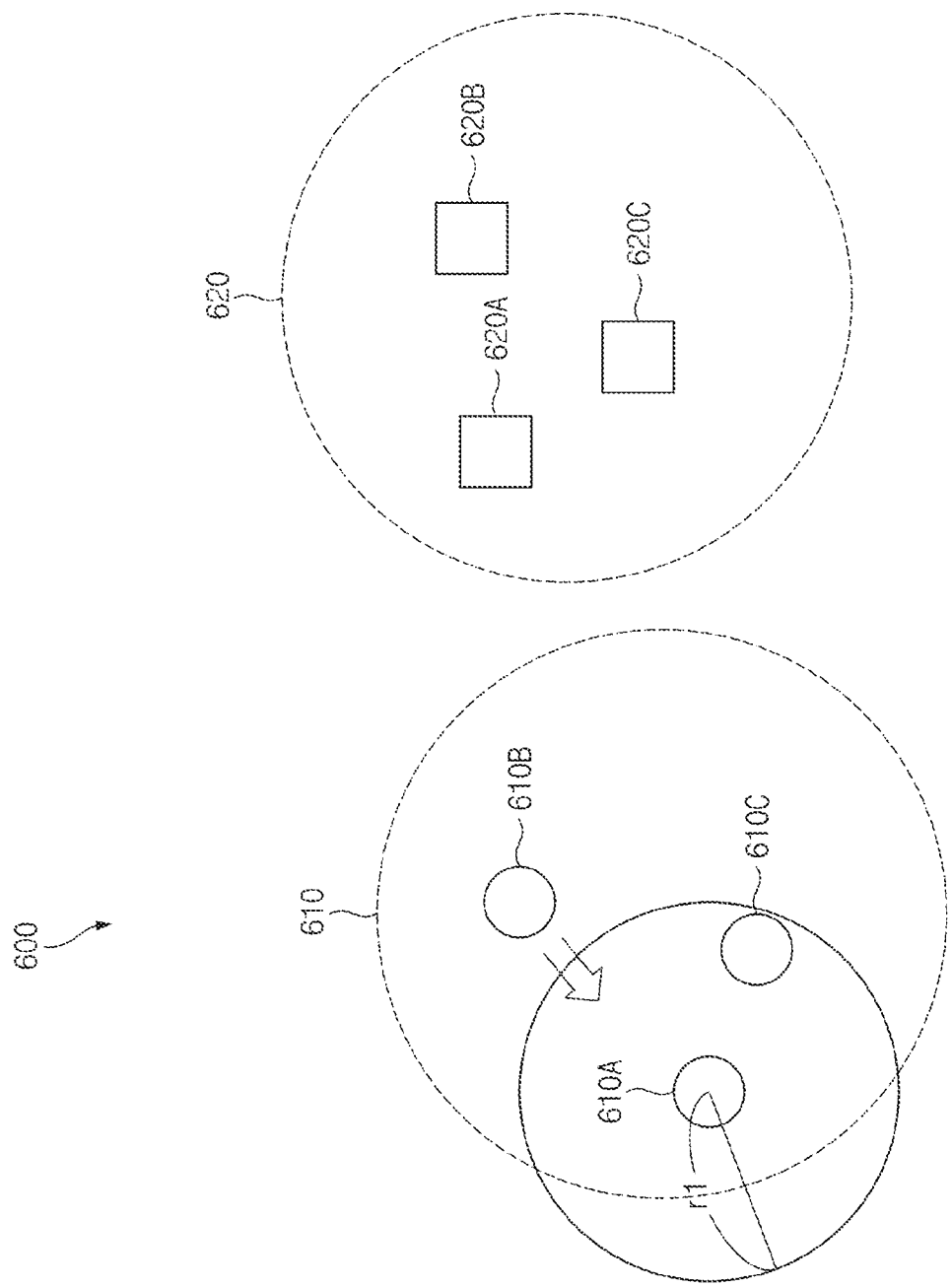
FIG. 6 is a diagram for illustrating a method for transmitting a location-based message according to various embodiments of the disclosure.

FIG. 6 is a diagram for illustrating a method 600 for transmitting a location-based message according to various embodiments of the disclosure.

Referring to FIG. 6, a server device (e.g., the server device 120 in FIG. 1) according to an embodiment may group and manage electronic devices registered as mutual friends among first to sixth electronic devices 610A, 610B, 610C, 620A, 620B, and 620C registered to use a message transmission service. For example, the server device 120 may manage the first to third electronic devices 610A, 610B, and 610C registered as the mutual friends as a first group 610, and manage the fourth to sixth electronic devices 620A, 620B, and 620C registered as the mutual friends as a second group 620. The server device 120 may track location information of the first to sixth electronic devices 610A, 610B, 610C, 620A, 620B, and 620C and share the tracked location information to electronic devices belonging to the same group.

As the server device 120 receives the location information of the first to sixth electronic devices 610A, 610B, 610C, 620A, 620B, and 620C from the first to sixth electronic devices 610A, 610B, 610C, 620A, 620B, and 620C at a specified time point, the server device 120 is able to track the location information of the first to sixth electronic devices 610A, 610B, 610C, 620A, 620B, and 620C. The specified time point may include, for example, at least one of a time point based on a specified period, a time point with a location change, or a time point of receiving a request of the first electronic device 610A (e.g., the first electronic device 110 in FIG. 1) or the second electronic device 610B (e.g., the second electronic device 130 in FIG. 1). As the server device 120 tracks the location information of the first to sixth electronic devices 610A. 610B, 610C, 620A, 620B, and 620C, the server device 120 is able to, for example, determine close electronic devices with respect to the first electronic device 610A within a certain region from the first electronic device 610A. For example, the server device 120 may determine the third electronic device 610C within a circle having a radius of r1 from the first electronic device 610A as the close electronic device. When the second electronic device 610B changes in location and newly enters the circle with the radius of r1 from the first electronic device 610A, the server device 120 may determine the second electronic device 610B as the close electronic device. In this case, the first electronic device 610A may receive a proximity notification message notifying the proximity of the second electronic device 610B.

Figure 7:
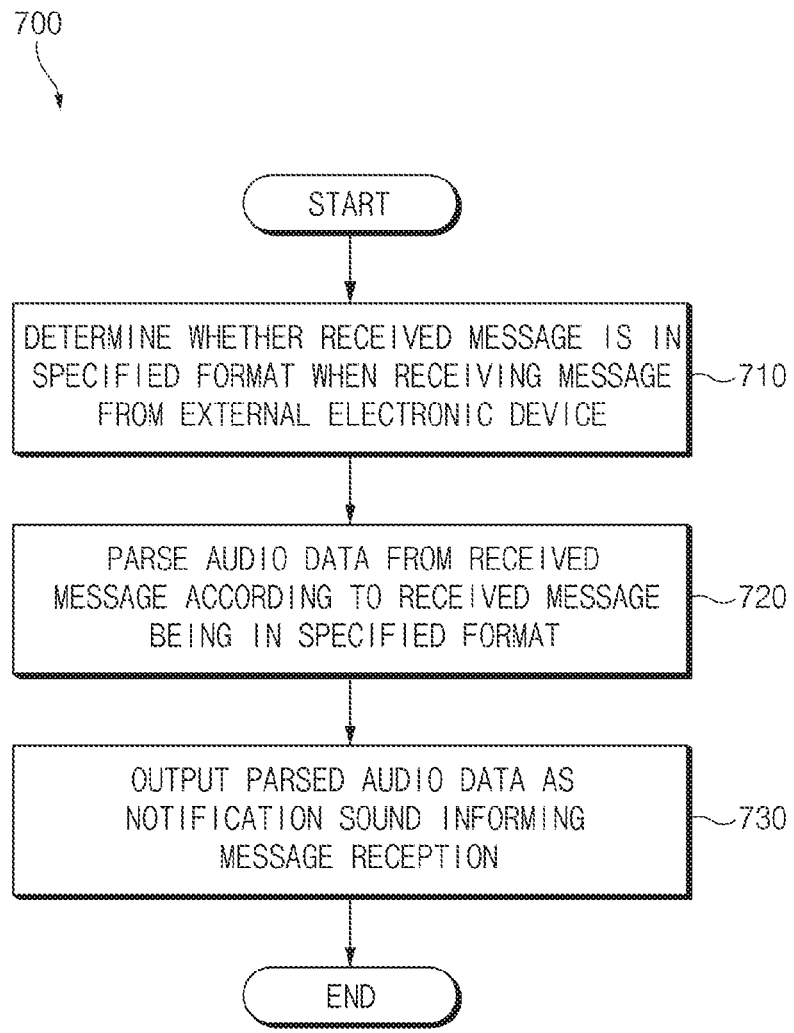
FIG. 7 is a flowchart of a message reception notification method by a receiving electronic device according to various embodiments of the disclosure.

FIG. 7 is a flowchart of a message reception notification method by a receiving electronic device (the second electronic device 130 in FIG. 1) according to various embodiments of the disclosure.

Referring to FIG. 7, in operation 710, when receiving a message from an external electronic device (e.g., the server device 120 in FIG. 1), the second electronic device 130 may determine whether the received message is in a specified format.

In operation 720, the second electronic device 130 may parse audio data from the received message according to the received message being in the specified format.

In operation 730, the second electronic device 130 may output the parsed audio data as a notification sound notifying message reception.

Figure 8:
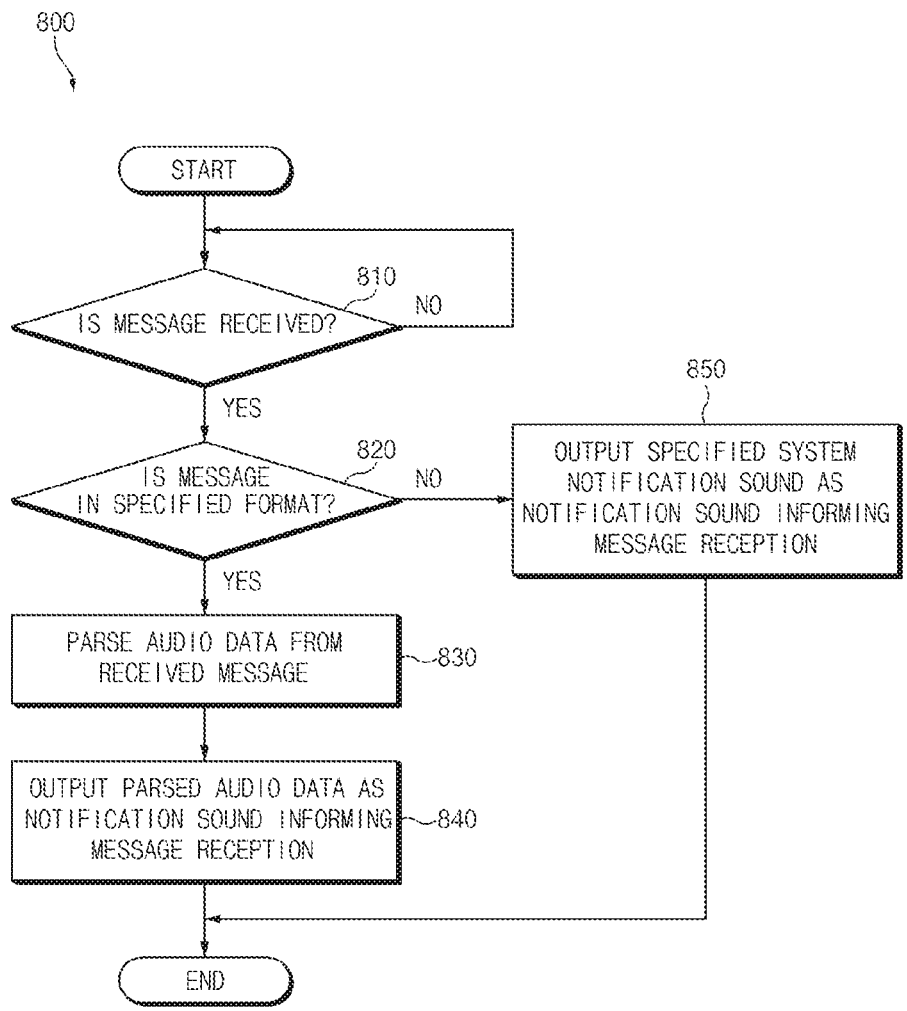
FIG. 8 is a detailed flowchart of a message reception notification method by a receiving electronic device according to various embodiments of the disclosure.

FIG. 8 is a detailed flowchart of a message reception notification method by a receiving electronic device (e.g., the second electronic device 130 in FIG. 1) according to various embodiments of the disclosure.

Referring to FIG. 8, in operation 810, the second electronic device 130 may identify message reception from an external electronic device (e.g., the server device 120 in FIG. 1).

In operation 820, when receiving the message, the second electronic device 130 may determine whether the received message is in a specified format. The message in the specified format may be, for example, a message containing user-related audio data of an electronic device user who has transmitted the message.

In operation 830, the second electronic device 130 may parse audio data from the received message according to the received message being in the specified format.

In operation 840, the second electronic device 130 may output the parsed audio data as a notification sound notifying the message reception.

In operation 850, the second electronic device 130 may output a specified system notification sound as the notification sound notifying the message reception according to the received message being not in the specified format.

Figure 9:
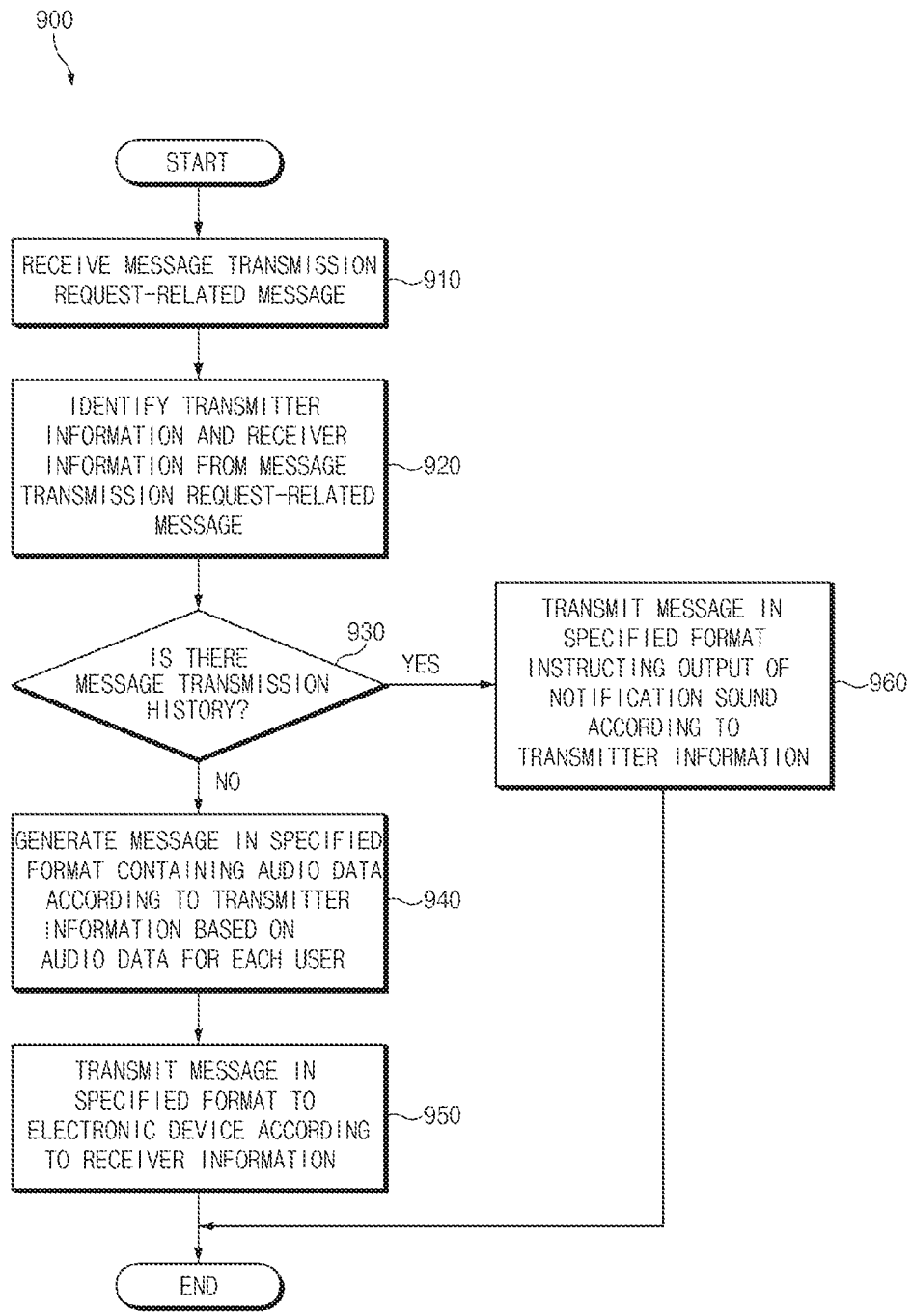
FIG. 9 is a flowchart of a specified message transmission method by a server device according to various embodiments of the disclosure.

FIG. 9 is a flowchart of a specified message transmission method by a server device according to various embodiments of the disclosure.

Referring to FIG. 9, in operation 910, a server device (e.g., the server device 120 in FIG. 1) may receive a message transmission request-related message (hereinafter, referred to as a 'request-related message') from a first electronic device (e.g., the first electronic device 110 in FIG. 1).

In operation 920, the server device 120 may identify transmitter information (e.g., the information of the first electronic device 110) and receiver information (e.g., the information of the second electronic device (130 in FIG. 2)) from the request-related message received from the first electronic device 110. The server device 120 may further identify information related to a type of the message form the request-related message.

In operation 930, the server device 120 may determine whether there is a message transmission history corresponding to the request-related message based on the transmitter information and the receiver information. For example, the server device 120 may determine whether there is a history of transmitting a message in a specified format containing first user-related audio data to the second electronic device 130 based on the receiver information in response to a request of the first electronic device 110 based on the transmitter information.

In operation 940, according to there being no message transmission history corresponding to the request-related message, the server device 120 may generate a message in a specified format containing audio data based on the transmitter information based on audio data for each user. The message in the specified format may further contain information related to a type of the message. The message type-related information may be information related to a content of the message.

In operation 950, the server device 120 may transmit the message in the specified format to the second electronic device 130 corresponding to the receiver information.

In operation 960, according to there being the message transmission history corresponding to the request-related message, the server device 120 may transmit the message in the specified format instructing an output of a notification sound corresponding to the transmitter information to the second electronic device 130 based on the receiver information. When receiving the message in the specified format, the second electronic device 130 may output user-related audio databased on the transmitter information stored in its own memory as a notification sound notifying reception of the message in the specified format.

Figure 10:
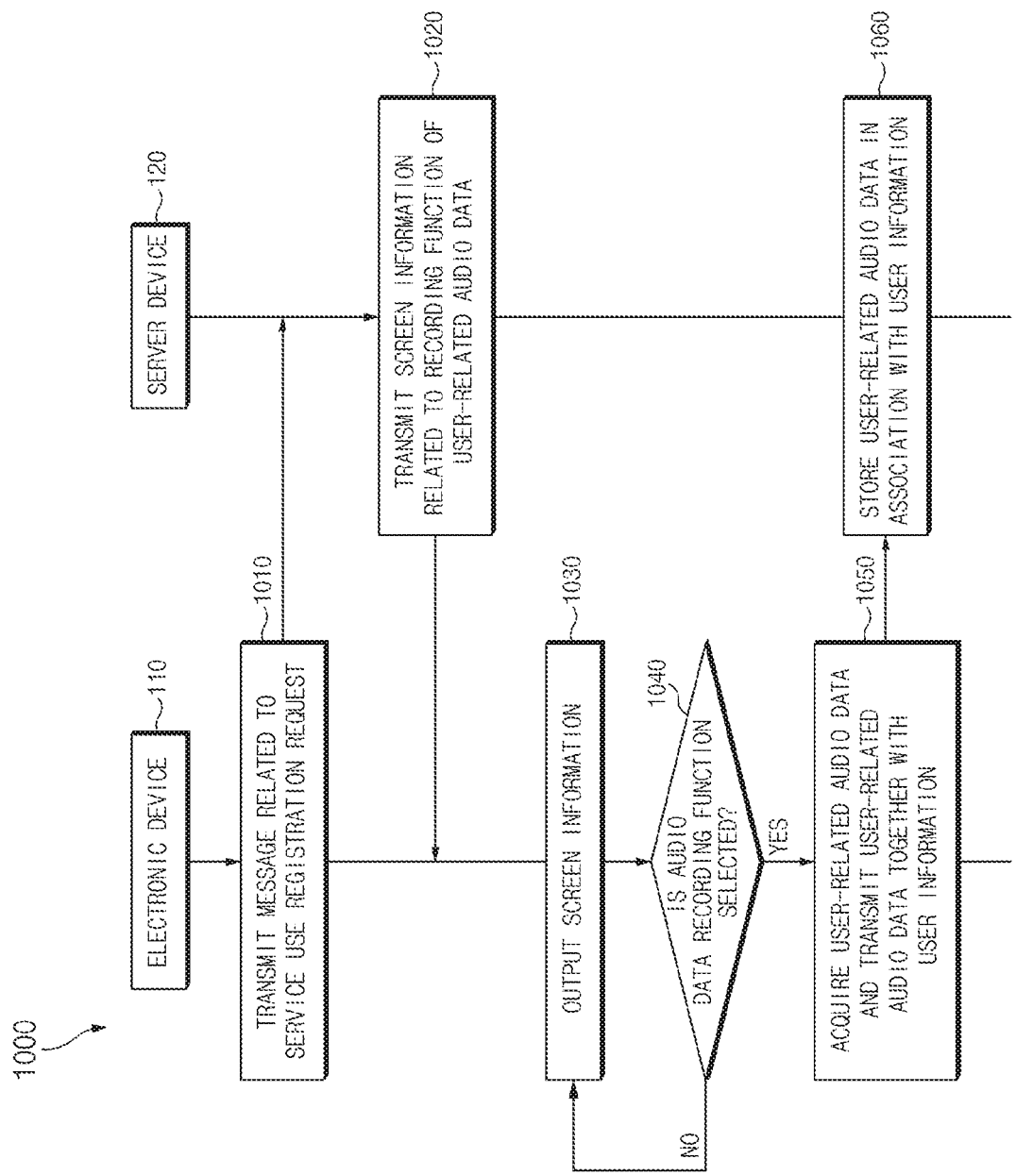
FIG. 10 is a flowchart of a service use registration process according to various embodiments of the disclosure.

FIG. 10 is a flowchart of a service use registration process according to various embodiments of the disclosure.

Referring to FIG. 10, in operation 1010, an electronic device the first electronic device 110 in FIG. 1) may transmit a message related to a registration request for use of a message transmission service to a server device (e.g., the server device 120 in FIG. 1).

In operation 1020, when receiving the message related to the message transmission service use registration request, the server device 120 may transmit screen information related to a recording function of user-related audio data to the electronic device 110.

In operation 1030, the electronic device 110 may receive the screen information and output the received screen information on a display the display 110D in FIG. 2).

In operation 1040, the electronic device 110 may determine whether the recording function of the audio data is selected by a user. According to the recording function of the audio data being not selected, the electronic device 110 may perform operation 1030.

In operation 1050, according to the recording function of the audio data being selected, the electronic device 110 may acquire the user-related audio data and transmit the user-related audio data together with device information. For example, the electronic device 110 may transmit a message containing the user-related audio data and the device information.

In operation 1060, a server device (e.g., 120 in FIG. 1) may store the device information and the user-related audio data in association with each other in a memory (e.g., the memory 123 in FIG. 3) as one of audio data for each user.

An electronic device (e.g., 110 in FIG. 2) according to various embodiments described above includes a communication circuit (e.g., 110A in FIG. 2), a sound output device (e.g., 110E in FIG. 2), and a processor (e.g., 110G in FIG. 2) electrically connected to the communication circuit and the sound output device, wherein the processor may determine whether a received message is in a specified format when receiving the message from an external server device through the communication circuit, parse audio data from the received message according to the received message being in the specified format, and output the parsed audio data through the sound output device as a notification sound notifying the reception of the message.

According to various embodiments, the processor may output a specified system notification sound as a notification sound notifying the message reception according to the received message being not in the specified format.

According to various embodiments, the processor may determine that the received message is in the specified. format according to the received message containing information related to output instruction of the notification sound for the parsed audio data.

According to various embodiments, the processor may receive the message in the specified format transmitted by the external server device in response to a request of a further electronic device.

According to various embodiments, the message in the specified format may contain audio data uttered by a user of the further electronic device and stored in the external server device.

According to various embodiments, the electronic device may further include a location sensor (e.g., 110C in FIG. 2), wherein the processor may identify current location information of the electronic device through the location sensor, and transmit the identified current location information of the electronic device to the external server device, wherein the message in the specified format may include a message transmitted by the external server device to notify a proximity of a further electronic device located within a specified distance from the electronic device based on the current location information of the electronic device.

According to various embodiments, the electronic device may further include an input device (e.g., 110B in FIG. 2), wherein tile processor may transmit the current location information of the electronic device to the external server device according to a location sharing function being set through the input device, and receive, from the external server device, a message notifying the proximity of the further electronic device agreed to share location information to the electronic device.

According to various embodiments, the electronic device may further include a display (e.g., 110D in FIG. 2), and an input device (110B in FIG. 2), wherein the processor may output screen information containing at least one menu icon for responding to the received message through the display, and transmit a response message based on a user input to the external server device according to the user input for the at least one menu icon being received through the input device.

According to various embodiments, the electronic device may further include a memory (e.g., 110F in FIG. 2) for storing at least one response data therein, and a microphone (e.g., 110B_1 in FIG. 2), wherein the processor may, according to audio data uttered by a user through the microphone being acquired, determine whether the audio data matches the at least one response data, and transmit a response message corresponding to the at least one response data to the external server device according to the acquired audio data matching the at least one response data.

According to various embodiments, the electronic device may further include an input device, and a microphone, wherein the processor may acquire user-related audio data through the microphone according to a specified user input being received through the input device, and transmit a message for allowing the acquired user-related audio data to be stored in the external server device to the external server device.

According to various embodiments, the electronic device may further include an input device, and a microphone, wherein the processor may transmit, to the external server device, a message for allowing a message containing user-related audio data of the electronic device stored in the external server device to be transmitted to a further electronic device according to a user input of requesting transmission of the message in the specified format to the further electronic device being received through the input device.

According to various embodiments, an electronic device (e.g., 110 in FIG. 2) includes a communication circuit (e.g., 110A in FIG. 2), a sound output device (e.g., 110E in FIG. 2), a processor (e.g., 110G in FIG. 2) electrically connected to the communication circuit and the sound output device, and a memory (e.g., 110F in FIG. 2) functionally connected to the processor, wherein the memory stores instructions that, when executed, cause the processor to determine whether a received message is in a specified format according to the message being received from an external server device through the communication circuit, parse audio data from the received message according to the received message being in the specified format, and output the parsed audio data through the sound output device as a notification sound notifying the reception of the message.

According to various embodiments, the instructions may further cause the processor to output a specified system notification sound as a notification sound notifying the message reception according to the received message being not in the specified format.

According to various embodiments, the instructions may further cause the processor to determine that the received message is in the specified format according to the received message containing information related to output instruction of the notification sound for the parsed audio data.

According to various embodiments, the instructions may further cause the processor to receive the message in the specified format transmitted by the external server device in response to a request of a further electronic device.

According to various embodiments, the message in the specified format may contain audio data uttered by a user of the further electronic device and stored in the external server device.

According to various embodiments, the electronic device may further include a location sensor (e.g., 110C in FIG. 2), wherein the instructions may further cause the processor to identify current location information of the electronic device through the location sensor, and transmit the identified current location information of the electronic device to the external server device, wherein the message in the specified format include a message transmitted by the external server device to notify a proximity of a further electronic device located within a specified distance from the electronic device based on the current location information of the electronic device.

A method for notifying message reception of an electronic device according to the various embodiments described above includes determining whether a received message is in a specified format according to the message being received from an external server device, parsing audio data from the received message according to the received message being in the specified format, and outputting the parsed audio data as a notification sound notifying the reception of the message.

According to various embodiments, the determining of whether the received message is in the specified format may include determining that the received message is in the specified format according to the received message containing information related to output instruction of the notification sound for the parsed audio data.

According to various embodiments, the method may further include receiving the message in the specified format transmitted by the external server device in response to a request of a further electronic device.

Figure 11:
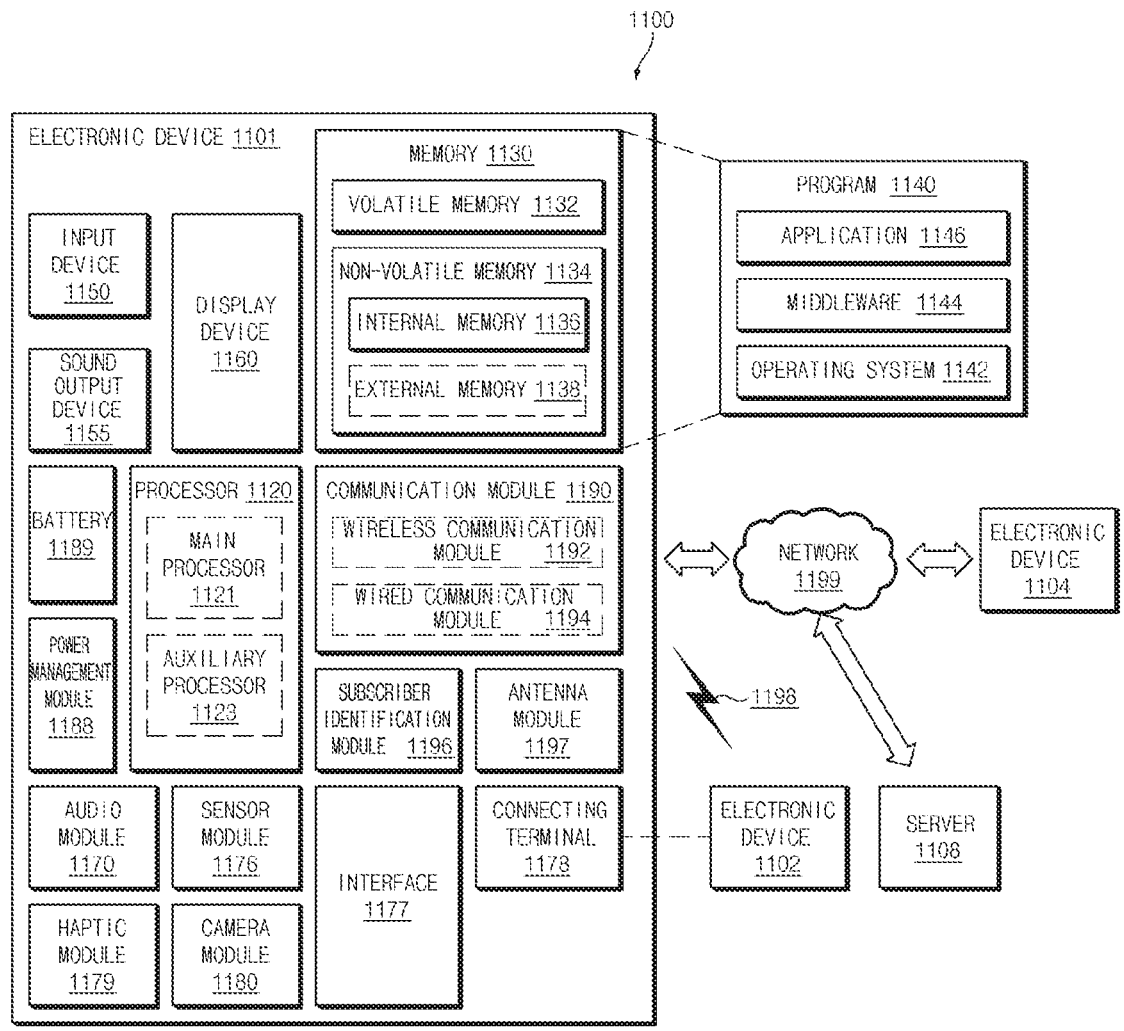
FIG. 11 illustrates a block diagram of an electronic device in a network environment that may notify message reception according to various embodiments.

FIG. 11 is a block diagram illustrating an electronic device 1101 (e.g., the second electronic device 130 in FIG. 1) in a network environment 1100 according to various embodiments. Referring to FIG. 11, the electronic device 1101 in the network environment 1100 tray communicate with an electronic device 1102 (e the second electronic device 130 in FIG. 1) via a first network 1198 (e.g., a short-range wireless communication network), or an electronic device 1104 (e.g., the second electronic device 130 in FIG. 1) or a server 1108 (e.g., the server device 120 in FIG. 1) via a second network 1199 (e.g., a long-range wireless communication network). According to an embodiment, the electronic device 1101 may communicate with the electronic device 1104 via the server 1108. According to an embodiment, the electronic device 1101 may include a processor 1120 (e.g., 130G in FIG. 4), memory 1130 (e.g., 130F in FIG. 4), an input device 1150 (e.g., 130B in FIG. 4), a sound output device 1155 (e.g., 130E in FIG. 4), a display device 1160 (e.g., 130D in FIG. 4), an audio module 1170, a sensor module 1176, an interface 1177, a haptic module 1179, a camera module 1180, a power management module 1188, a battery 1189, a communication module 1190 (e.g., 130A in FIG. 4), a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related, to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, or a keyboard.

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to an embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device the electronic device 1102). According to an embodiment, the connecting terminal 1178 may include, for example, a HDMI connector, a USB connector, a SD card connector, or an audio connector (e.g., a headphone connector), The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104 or the server 1108) and performing communication via the established communication channel. The communication module 1190 may include one or more communication processors that are operable independently from the processor 1120 (e.g., the application processor (AP)) and supports a direct (wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (the external electronic device) of the electronic device 1101. According to an embodiment, the antenna module 1197 may include one or more antennas, and, therefrom, at least one antenna appropriate for a communication scheme used in the communication network, such as the first network 1198 or the second network 1199, may be selected, for example, by the communication module 1190 (e.g., the wireless communication module 1192). The signal or the power may then be transmitted or received between the communication module 1190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to an embodiment, all or some of operations to be executed at the electronic device 1101 may be executed at one or more of the external electronic devices 1102, 1104, or 1108. For example, when the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101) For example, a processor (e.g.., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. when distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted., or one or more other operations may be added. Accordingly, the scope of the disclosure should be construed to include all changes or various other embodiments based on the technical idea of the disclosure.

What is claimed is:

1. An electronic device comprising:
 a communication circuit;
 a display;
 a sound output device; and
 a processor electrically connected to the communication circuit, the display, and the sound output device,
 wherein the processor is configured to:
  receive, through the communication circuit, a message selected from among a plurality of messages each including predetermined content by an external electronic device, from an external server device, the received message comprising audio data recorded by a user of the external electronic device uttering a specified word;
  determine whether the received message is in a specified format, the specified format comprising audio data for a notification sound for notifying receiving of the message by the electronic device;

based on determining the received message to be in the specified format, parse the audio data from the received message;

output the parsed audio data through the sound output device as the notification sound for notifying the receiving of the message;

output a user interface for selecting a response message, on the display, and transmit a selected response message based on an input to the user interface to the external electronic device, wherein the transmitted response message includes audio data of a user of the electronic device.

2. The electronic device of claim 1, wherein the specified format further comprises information related to an output instruction for outputting the notification sound.

3. The electronic device of claim 1, wherein the message in the specified format is received from the external server device based on to a request to the external server device of a further electronic device.

4. The electronic device of claim 3, wherein the notification sound comprises audio data uttered by a user of the further electronic device and stored in the external server device.

5. The electronic device of claim 1, further comprising:
a location sensor,
wherein the processor is configured to:
identify current location information of the electronic device through the location sensor; and
transmit, to the external server device, through the communication circuit, the identified current location information of the electronic device,
wherein the message in the specified format includes a message transmitted by the external server device to notify a proximity of a further electronic device located within a specified distance from the electronic device, based on the current location information of the electronic device.

6. The electronic device of claim 5, further comprising:
an input device,
wherein the processor is configured to:
based on a location sharing function being set through the input device, transmit, through the communication circuit, the current location information of the electronic device to the external server device; and
receive, through the communication circuit, from the external server device, the message notifying the proximity of the further electronic device based on the further electronic device being configured to share location information to the electronic device.

7. The electronic device of claim 1, further comprising:
an input device;
wherein the processor is configured to:
output screen information comprising at least one menu icon for responding to the received message, through the display; and
based on a user input for selecting the at least one menu icon being received through the input device, transmit, through the communication circuit, to the external server device, a response message based on the user input.

8. The electronic device of claim 1, further comprising:
a memory for storing at least one response data therein; and
a microphone,
wherein the processor is configured to:
based on acquiring to audio data uttered by a user through the microphone, determine whether the audio data matches the at least one response data; and
transmit, through the communication circuit, a response message corresponding to the at least one response data to the external server device based on the acquired audio data matching the at least one response data.

9. The electronic device of claim 1, further comprising:
an input device; and
a microphone,
wherein the processor is configured to:
acquire user-related audio data through the microphone based on receiving a specified user input through the input device; and
transmit, through the communication circuit, to the external server device, a message for allowing the acquired user-related audio data to be stored in the external server device.

10. The electronic device of claim 1, further comprising:
an input device; and
a microphone,
wherein the processor is configured to transmit, through the communication circuit, to the external server device, a message for allowing a message containing user-related audio data of the electronic device stored in the external server device to be transmitted to a further electronic device based on receiving to a user input requesting transmission of the message in the specified format to the further electronic device through the input device.

11. The electronic device of claim 1, wherein the processor is configured to, based on determining the received message to not be in the specified format, output, through the sound output device, a notification sound pre-set in the electronic device for notifying the receiving of the message.

12. An electronic device comprising:
a communication circuit;
a display;
a sound output device;
a processor electrically connected to the communication circuit and the sound output device; and
a memory functionally connected to the processor,
wherein the memory stores instructions that, when executed, cause the processor to:
receive, through the communication circuit, a message selected from among a plurality of messages each including predetermined content by an external electronic device, from an external server device, the received message comprising audio data recorded by a user of the external electronic device uttering a specified word;
determine whether the received message is in a specified format, the specified format comprising audio data for a notification sound for notifying receiving of the message by the electronic device;
based on determining the received message to be in the specified format, parse the audio data from the received message;
output the parsed audio data through the sound output device as the notification sound for notifying the receiving of the message;
output a user interface for selecting a response message, on the display; and
transmit a selected response message based on an input to the user interface to the external electronic device, wherein the transmitted response message includes audio data of a user of the electronic device.

13. The electronic device of claim 12, wherein the specified format further comprises information related to an output instruction for outputting the notification sound.

14. The electronic device of claim 12, wherein the message in the specified format is received from the external server device based on to a request to the external server device of a further electronic device.

15. The electronic device of claim 14, wherein the notification sound comprises audio data uttered by a user of the further electronic device and stored in the external server device.

16. The electronic device of claim 12, further comprising:
a location sensor,
wherein the instructions further cause the processor to:
identify current location information of the electronic device through the location sensor; and
transmit, to the external server device, through the communication circuit, the identified current location information of the electronic device,
wherein the message in the specified format includes a message transmitted by the external server device to notify a proximity of a further electronic device located within a specified distance from the electronic device, based on the current location information of the electronic device.

17. The electronic device of claim 12, wherein the instructions further cause the processor to, based on determining the received message to not be in the specified format, output, through the sound output device, a notification sound pre-set in the electronic device for notifying the receiving of the message.

18. A method of an electronic device for notifying receiving of a message by the electronic device, the method comprising:
receiving, through a communication circuit of the electronic device, a message selected from among a plurality of messages each including predetermined content by an external electronic device, from an external server device, the received message comprising audio data recorded by a user of the external electronic device uttering a specified word;
determining whether the received message is in a specified format, the specified format comprising audio data for a notification sound for notifying receiving of the message by the electronic device;
based on determining the received message to be in the specified format, parsing the audio data from the received message;
outputting the parsed audio data through a sound output device of the electronic device as the notification sound for notifying the receiving of the message;
outputting a user interface for selecting a response message, on a display of the electronic device; and
transmitting a selected response message based on an input to the user interface to the external electronic device,
wherein the transmitted response message includes audio data of a user of the electronic device.

19. The method of claim 18, further comprising:
based on determining the received message to not be in the specified format, outputting, through the sound output device, a notification sound pre-set in the electronic device for notifying the receiving of the message.

* * * * *